US008804942B2

(12) United States Patent
Benefield et al.

(10) Patent No.: US 8,804,942 B2
(45) Date of Patent: *Aug. 12, 2014

(54) ROUTING AND QUEUING INFORMATION FOR VIDEO CONFERENCING IN BANKING CENTERS

(75) Inventors: Stefani R. Benefield, Pensacola, FL (US); James R. Grimsley, Jacksonville, FL (US); Rosemary Hill, Jacksonville, FL (US); Varsha Shitut, Wilkes Barre, PA (US); Sheryl L. Stewart, Stoughton, MA (US)

(73) Assignee: Bank of America Corporation, Charlotte, NC (US)

( * ) Notice: Subject to any disclaimer, the term of this patent is extended or adjusted under 35 U.S.C. 154(b) by 289 days.

This patent is subject to a terminal disclaimer.

(21) Appl. No.: 12/847,418

(22) Filed: Jul. 30, 2010

(65) Prior Publication Data

US 2011/0261947 A1  Oct. 27, 2011

Related U.S. Application Data

(60) Provisional application No. 61/328,532, filed on Apr. 27, 2010.

(51) Int. Cl.
*H04M 3/00* (2006.01)
*H04N 7/14* (2006.01)
*H04L 12/18* (2006.01)

(52) U.S. Cl.
CPC ............ *H04N 7/147* (2013.01); *H04L 12/1827* (2013.01)
USPC .................................. 379/265.12; 348/14.01

(58) Field of Classification Search
USPC ............. 379/265.09, 265.12, 265.01, 265.11, 379/266
See application file for complete search history.

(56) References Cited

U.S. PATENT DOCUMENTS

| 5,774,663 | A | 6/1998 | Randle et al. | |
|---|---|---|---|---|
| 5,825,869 | A | * 10/1998 | Brooks et al. | ............ 379/265.12 |
| 6,847,714 | B2 | * 1/2005 | Das et al. | ................. 379/265.12 |
| 7,372,952 | B1 | * 5/2008 | Wu et al. | ................. 379/220.01 |

(Continued)

OTHER PUBLICATIONS

International Search Report and Written Opinion for International Patent Application No. PCT/US2011/033901 filed Apr. 26, 2011.

(Continued)

*Primary Examiner* — Amal Zenati
(74) *Attorney, Agent, or Firm* — Michael A. Springs; Moore & Van Allen PLLC; Jeffrey R. Gray

(57) ABSTRACT

Embodiments of the present invention provide apparatuses and methods for providing improved customer service and sales experiences through collaborative face-to-face interaction between a customer and an expert in another location. Some embodiments of the invention comprise apparatuses and methods for video collaboration between an associate of the business located on-site at the point of inquiry, the customer who requires customer service, and an expert located off-site, typically at a call center. Other embodiments of the invention comprise apparatuses and methods for queuing video collaboration and non-video collaboration calls within a call center. The embodiments of the invention relate to apparatuses and methods that can be used for any business that has on-site point of inquiry centers, but the apparatuses and methods are particularly useful for banking customers who enter banking centers to interact on a face-to-face basis with an expert in the area of the customer's needs.

15 Claims, 6 Drawing Sheets

(56) References Cited

U.S. PATENT DOCUMENTS

| | | |
|---|---|---|
| 2002/0172347 A1 | 11/2002 | Elsey |
| 2005/0100160 A1* | 5/2005 | Bae .......................... 379/266.01 |
| 2006/0004660 A1 | 1/2006 | Pranger |
| 2006/0062376 A1 | 3/2006 | Pickford |
| 2006/0256954 A1* | 11/2006 | Patel et al. ............... 379/265.12 |
| 2008/0186377 A1* | 8/2008 | Eriksson et al. ........... 348/14.01 |

OTHER PUBLICATIONS

IPRP and Written Opinion dated Oct. 30, 2012 for International Application No. PCT/US2011/033901.

\* cited by examiner

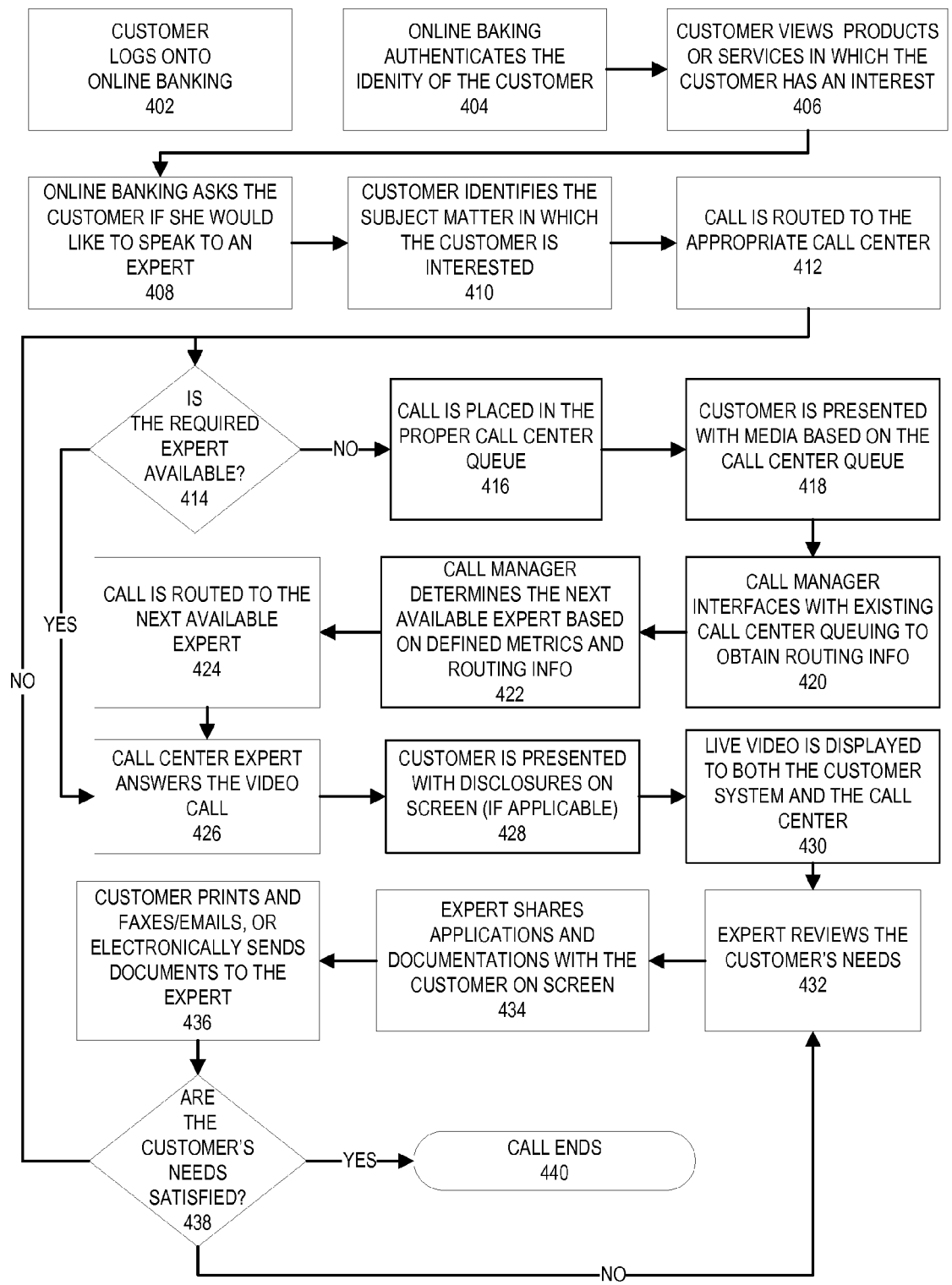

ROUTING AND QUEUING INFORMATION FOR VIDEO CONFERENCING IN BANKING CENTERS

CROSS REFERENCE TO RELATED APPLICATIONS

This application claims benefit of priority under 35 U.S.C. §119(e) to the filing date of U.S. Provisional Application No. 61/328,532, as filed on Apr. 27, 2010, which is incorporated herein by reference in its entirety.

FIELD

This invention relates generally to customer service and sales, and more particularly, embodiments of the invention relate to apparatuses and methods for effectively utilizing video conferencing to connect customers and experts for efficiently meeting the customers' needs.

BACKGROUND

Customers that are looking for expertise regarding products or services that they wish to purchase, or have previously purchased or used, often contact customer service representatives by visiting a store or location that is most convenient, visiting a store or location where the customer purchased or signed up for the product or service, or calling customer service representatives over the telephone.

Store locations have limited space to employ customer representatives that are able to serve all of the needs of the customers. Furthermore, since the need for the advice of experts on products and services is based on the timing of the needs of the customers, it is often impractical to place customer representatives with knowledge of every product and service in every store location because much of the time the customer representatives would have little to do. Therefore, it is simply not cost effective to have multiple customer representatives that are knowledgeable about a large breadth of products and services working in every store location. Additionally, when customer representatives with a particular area of expertise are located in a store, in some instances, the customer representatives with the required expertise are busy providing service to another customer, or are otherwise not available when necessary. Still, in some instances when customer representatives are located at a store, they simply may not have the required expertise in a particular area to answer the questions of the customers. Thus, it is often difficult to mesh customer needs with the expertise of a customer representative that can answer the customer's questions. In the cases when a customer representative at the store is not available to meet the needs of the customer, there exists a need to direct a customer to another customer representative that can meet customer's needs.

Call centers are often set up in a supporting role so customers at a store location or other location can talk over the telephone with a customer representative that has the required expertise to deal with the customers' needs. However, telephone calls are a less personal form of customer service between the customer and the customer representative than face-to-face interaction. Customers often feel that face-to-face meetings are more personal and more informative. Therefore, in such cases, a customer may be reluctant to speak with a representative over the telephone at a call center, or the phone call may be less productive due to the inability of the customer representative to gain the trust of the customer in a non-face to face experience.

There are gaps throughout the customer service processes provided by on-site customer representatives and call center customer representatives due to on-site customer representatives and call center representatives that are forced to deal with product and service related issues that they do not have the expertise to handle. Therefore, there is a need for apparatuses and methods for effectively matching the expertise of the customer service representatives with customers in a personal setting.

BRIEF SUMMARY

Embodiments of the present invention address the above needs and/or achieve other advantages by providing apparatuses (e.g., a system, computer program product, and/or other device) and methods for providing improved customer service and sales experiences through collaborative face-to-face interaction between a customer and an expert in another location. Some embodiments of the invention comprise apparatuses and methods for video collaboration between an associate of the business located on-site at the point of inquiry, the customer who requires customer service, and an expert located off-site, typically at a call center. Other embodiments of the invention comprise apparatuses and methods for queuing video collaboration and non-video collaboration calls within a call center. Still other embodiments of the invention comprise video collaboration sessions that are implemented through a customer's computer system using the customer's online banking account or other video collaboration tool. The embodiments of the invention relate to apparatuses and methods that can be used for any business that has on-site point of inquiry centers, but the apparatuses and methods are particularly useful for banking customers who enter banking centers to speak to associates regarding the customers' needs. If the banking associate cannot provide the required information, or is too busy to meet with the customer, the present invention allows the customer to interact on a face-to-face basis with an expert in the area of the customer's needs who is located off-site.

One embodiment of the invention is a system for routing and queuing calls comprising, a memory device, a communication device, a processing device operatively coupled to the communication device and the memory device, and computer readable program code stored on said memory device, wherein said computer readable program code includes instructions that when performed by said processing device causes said processing device to receive an incoming call from a customer interface. The instructions performed by the processing device further causes said processing device to identify routing instructions associated with the call, wherein the routing instructions at least indicate a type of customer inquiry associated with the call. The instructions performed by the processing device also causes said processing device to route the call to at least one designated station based on the type of customer inquiry associated with the call.

In further accord with an embodiment of the invention, the instructions when performed by said processing device further causes said processing device to identify that a designated station is not available, and place the call in a queue.

In another embodiment of the invention, the instructions when performed by said processing device further causes said processing device to output visual media to a display for viewing by the customer while the call is in the queue when the call is determined to be video enabled.

In yet another embodiment of the invention, the instructions when performed by said processing device further causes said processing device to identify from routing instructions associated with the call, whether the call is a video enabled call, and route the call to a station capable of communicating via video communication.

In still another embodiment of the invention, the instructions when performed by said processing device further causes said processing device to identify from routing instructions associated with the call a desired language associated with the customer, and route the call to a station associated with personnel capable of communicating in the desired language.

In further accord with an embodiment of the invention, the instructions when performed by said processing device further causes said processing device to access expertise information of different personnel associated with different stations, and route the call to a specific station based on the associated personnel's expertise.

In another embodiment of the invention, the instructions when performed by said processing device further causes said processing device to access handle time information of different stations, and route the call to a specific station based on the associated handle time information.

In yet another embodiment of the invention, the instructions when performed by said processing device causes said processing device to access staffing level information associated with a plurality of stations, and route the call to a specific station based on the associated staffing level information.

In still another embodiment of the invention, the at least one designated station is located at a call center.

Another embodiment of the invention is a method for routing and queuing calls. The method comprises receiving an incoming call from a customer interface, through the use of a processing device. The method further comprises identifying routing instructions associated with the call, through the use of the processing device, wherein the routing instructions at least indicate a type of customer inquiry associated with the call. The method also comprises routing the call to at least one designated station based on the type of customer inquiry associated with the call, through the use of the processing device.

In further accord with an embodiment of the invention, the method further comprises identifying that a designated station is not available, through the use of the processing device, and placing the call in a queue, through the use of the processing device.

In another embodiment of the invention, the method further comprises outputting visual media to a display for viewing by the customer while the call is in the queue when the call is determined to be video enabled, through the use of the processing device.

In yet another embodiment of the invention, the method further comprises identifying from routing instructions associated with the call whether the call is a video enabled call, through the use of the processing device, and routing the call to a station capable of communicating via video communication, through the use of the processing device.

In still another embodiment of the invention, the method further comprises identifying from routing instructions associated with the call a desired language associated with the customer, through the use of the processing device, and routing the call to a station associated with personnel capable of communicating in the desired language, through the use of the processing device.

In further accord with an embodiment of the invention, the method further comprises accessing expertise information of different personnel associated with different stations, through the use of the processing device, and routing the call to a specific station based on the associated personnel's expertise, through the use of the processing device.

In another embodiment of the invention, the method further comprises accessing handle time information of different stations, through the use of the processing device, and routing the call to a specific station based on the associated handle time information, through the use of the processing device.

In yet another embodiment of the invention, the method further comprises accessing staffing level information associated with a plurality of stations, through the use of the processing device, and routing the call to a specific station based on the associated staffing level information, through the use of the processing device.

In still another embodiment of the invention, the at least one designated station is located at a call center.

Another embodiment of the invention is a computer program product for a system for routing and queuing call center calls, the computer program product comprising at least one non-transitory computer-readable medium having computer-readable program code portions embodied therein. The computer-readable program code portions comprise an executable portion configured for receiving an incoming call from a customer interface. The computer-readable program code portions further comprise an executable portion configured for identifying routing instructions associated with the call, wherein the routing instructions at least indicate a type of customer inquiry associated with the call. The computer-readable program code portions also comprise an executable portion configured for routing the call to at least one designated station based on the type of customer inquiry associated with the call.

In another embodiment of the invention, the computer program product further comprises an executable portion configured for identifying that a designated station is not available, and an executable portion configured for placing the call in a queue.

In yet another embodiment of the invention, the computer program product further comprises an executable portion configured for outputting visual media to a display for viewing by the customer while the call is in the queue when the call is determined to be video enabled.

In still another embodiment of the invention, the computer program product further comprises an executable portion configured for identifying from routing instructions associated with the call whether the call is a video enabled call, and an executable portion configured for routing the call to a station capable of communicating via video communication.

In further accord with an embodiment of the invention, the computer program product further comprises an executable portion configured for identifying from routing instructions associated with the call a desired language associated with the customer, and an executable portion configured for routing the call to a station associated with personnel capable of communicating in the desired language.

In another embodiment of the invention, the computer program product further comprises an executable portion configured for accessing expertise information of different personnel associated with different stations, and an executable portion configured for routing the call to a specific station based on the associated personnel's expertise.

In yet another embodiment of the invention, the computer program product further comprises an executable portion configured for accessing handle time information of different stations, and an executable portion configured for routing the call to a specific station based on the associated handle time information.

In still another embodiment of the invention, the computer program product further comprises an executable portion configured for accessing staffing level information associated with a plurality of stations, and an executable portion configured for routing the call to a specific station based on the associated staffing level information.

In another embodiment of the invention, the at least one designated station is located at a call center.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
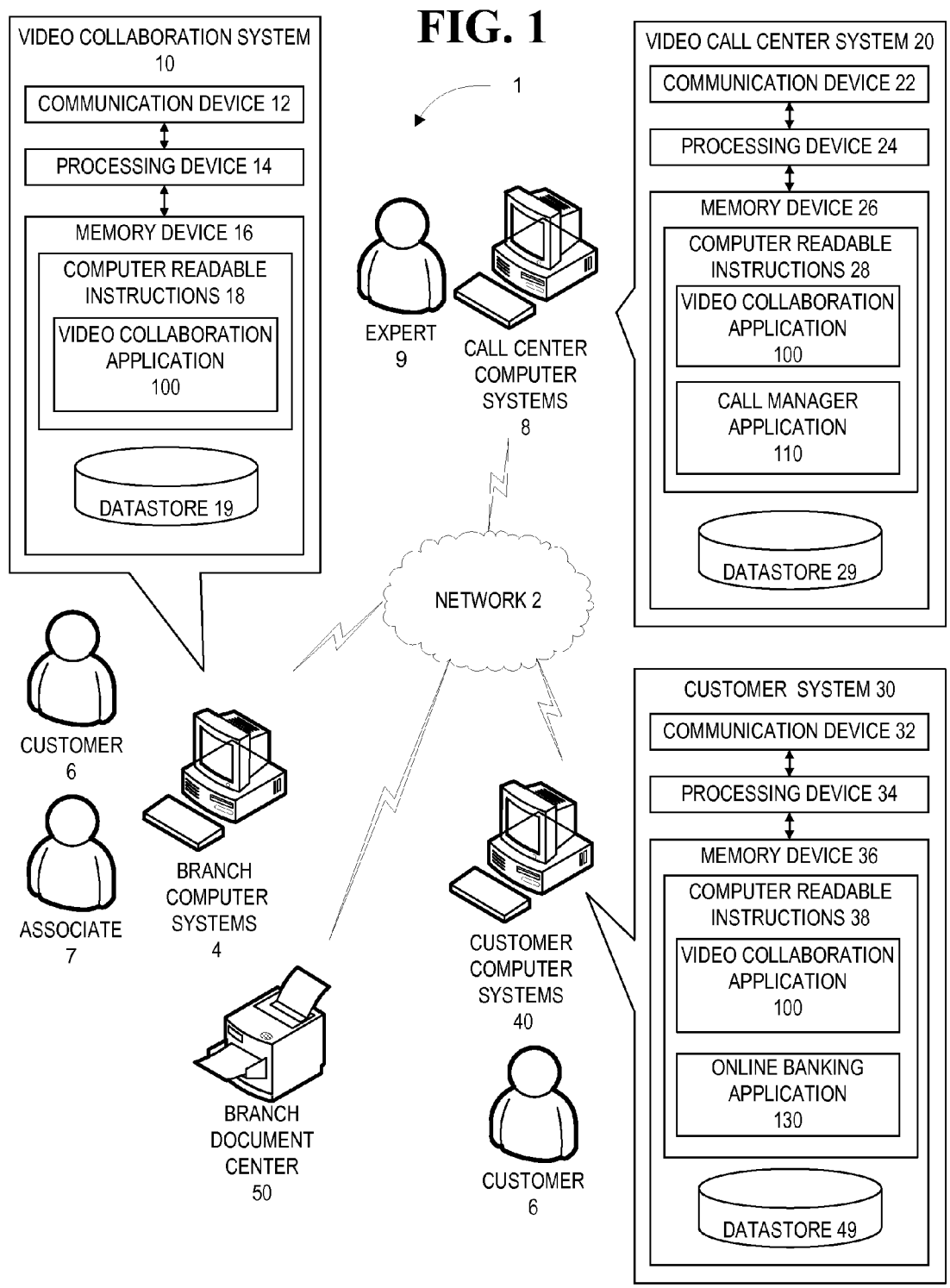
Figure 2:
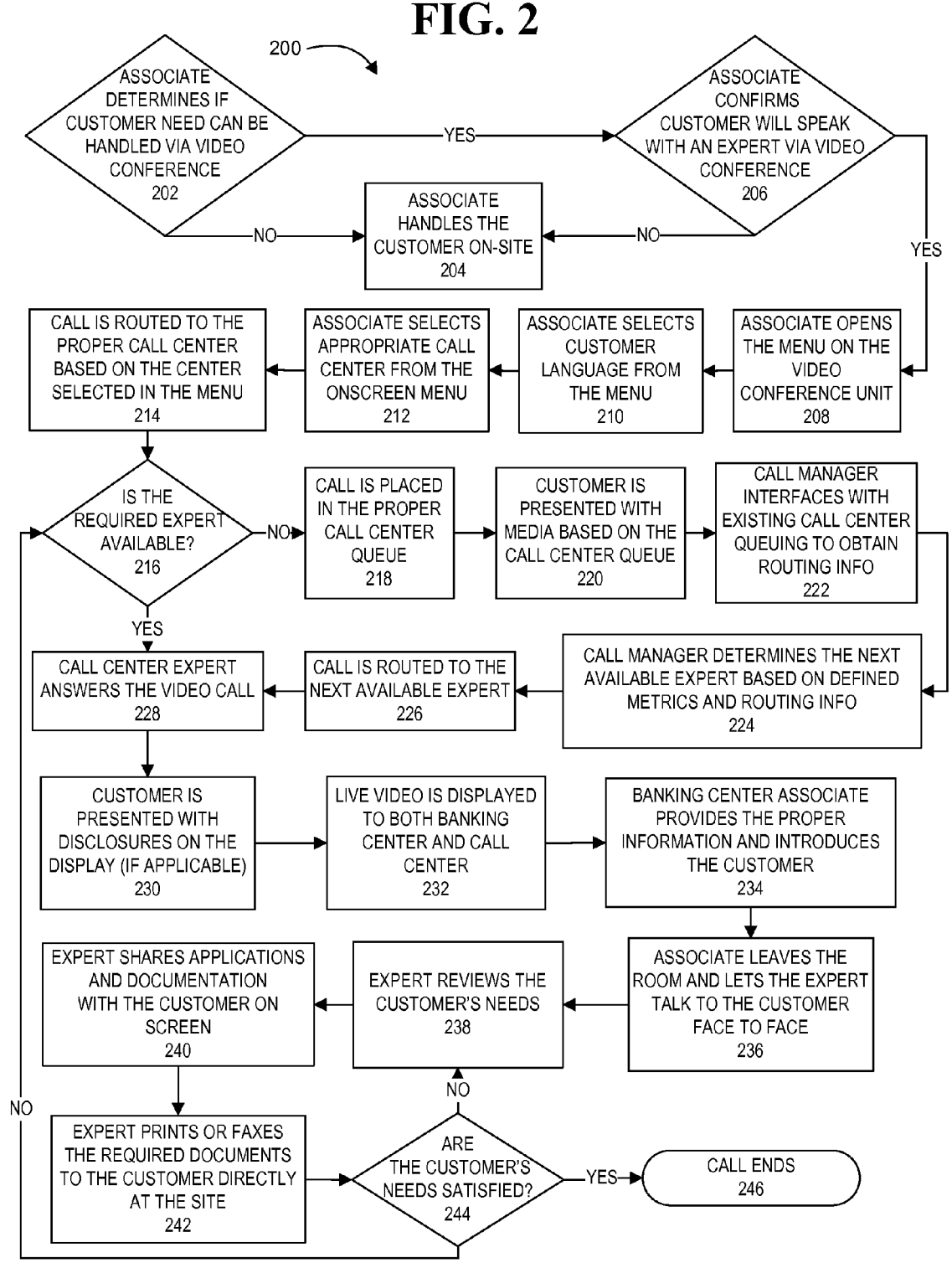
Figure 3A:
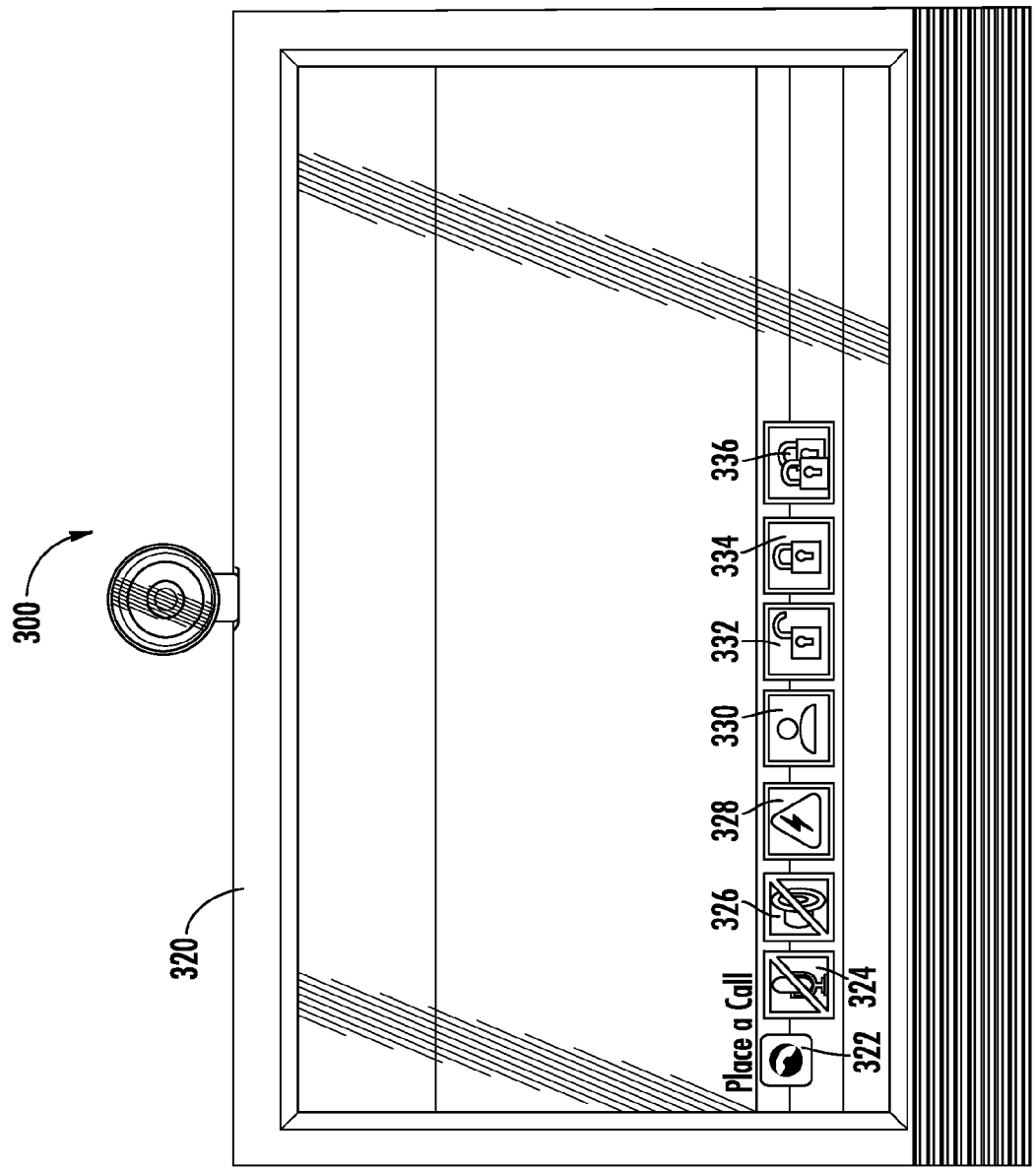
Figure 3B:
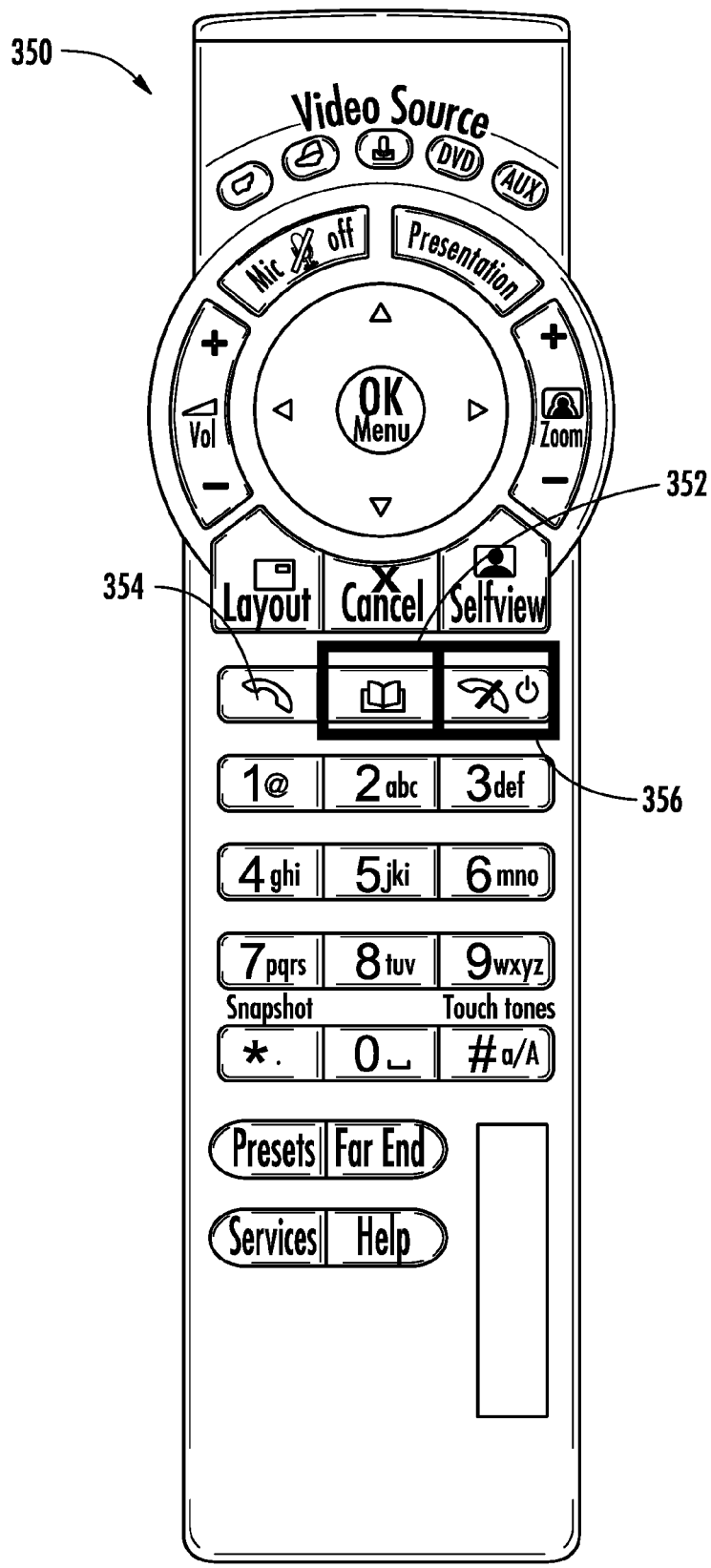
Figure 5:
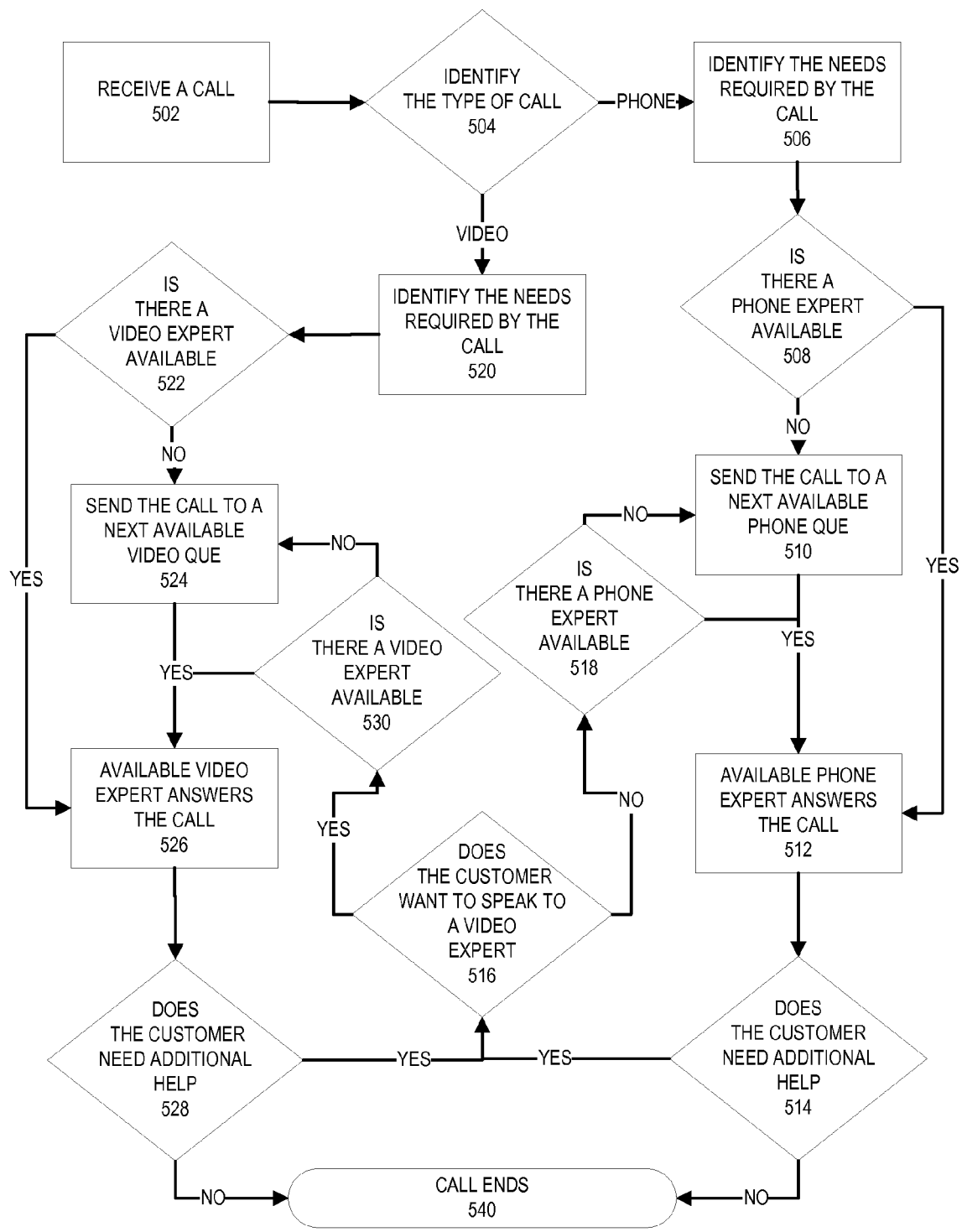

Having thus described embodiments of the invention in general terms, reference will now be made to the accompanying drawings, which are not necessarily drawn to scale, and wherein:

FIG. 1 provides a video collaboration environment, in accordance with an embodiment of the invention;

FIG. 2 illustrates a flow diagram describing a store location video collaboration process, in accordance with an embodiment of the invention;

FIG. 3a illustrates a video collaboration system display, in accordance with an embodiment of the invention;

FIG. 3b illustrates a video collaboration system control, in accordance with an embodiment of the invention;

FIG. 4 illustrates a flow diagram describing an online banking video collaboration process, in accordance with an embodiment of the invention; and FIG. 5 illustrates a flow diagram describing a call queuing process for a call center, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although the embodiments of the invention described herein are generally described as involving a "bank," one of ordinary skill in the art will appreciate that other embodiments of the invention may involve other financial institutions, or businesses outside of financial institutions, that utilize customer representatives, call centers, or other comparable systems.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

FIG. 1 illustrates a video collaboration environment 1, in accordance with an embodiment of the present invention. As illustrated in FIG. 1, the branch computer systems 4 are operatively coupled, via a network 2 to the call center computer systems 8, customer computer systems 40, branch document center 50, and other branch computer systems at other locations, as well as other business systems. In this way, the customer 6 and associate 7 can communicate through the video collaboration system 10 with an expert 9 through the video call center system 20 on the call center computer systems 8. In some embodiments of the invention, the associate 7 is a banking center employee located on-site at a banking center, however, in other embodiments of the invention the associate 7 is an agent, contractor, or other person designated to act on behalf of the bank. In some embodiments of the invention, the expert 9 is a call center banking employee trained in one or more specific areas of products or services offered at the bank, however, in other embodiments of the invention the expert 9 is an agent, contractor, or other person designated to act on behalf of the bank. The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network.

As illustrated in FIG. 1, the video collaboration system 10 is located on the branch computer systems 4 located at various banking centers, and generally comprises a communication device 12, a processing device 14, and a memory device 16. In some embodiments of the invention the video collaboration system 10 can be a stand alone system or part of another system that is not located on the branch computer systems 4, but is also operatively connected to other devices through the network 2. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12, and the memory device 16. The processing device 14 uses the communication device 12 to communicate with the network 2, and other devices on the network 2, such as, but not limited to, the call center computer systems 8, the customer computer systems 40, the branch document center 50, and other business systems. Furthermore, the branch computer systems 4 can be located at various branch sites and can communicate with each other over the network 2. As such, the communication device 12 generally comprises a modem, server, or other device for communicating with other devices on the network 2, and a display, camera, keypad, mouse, keyboard, microphone, and/or speakers for communicating with one or more customers 6 or associates 7.

As further illustrated in FIG. 1, the video collaboration system 10 comprises computer-readable instructions 18 stored in the memory device 16, which in one embodiment include the computer-readable instructions 18 of a video collaboration application 100. In some embodiments, the memory device 16 includes a datastore 19 for storing data related to the video collaboration system 10, including but not limited to data created and/or used by the video collaboration application 100. The video collaboration application 100 allows the customer 6 to participate in a video collaboration session with an expert 9 at another location, such as a call center or other branch location, in order to help answer customer questions regarding products and services when an associate 7 is not available, does not have the required expertise, or is busy with other customers.

It will be understood that systems, devices, servers, processors, computers, networks, and other devices described herein may be made up of one system, device, server, processor, computer, network, etc., or numerous systems, devices, servers, processors, computers, networks, etc. working in conjunction with each other. Also, it is to be understood that use of the term computer system includes, but is not limited, desktop, laptop, smart phone, personal display device (PDA), televisions with network access, or any other electronic system that has a communication device, processing device, and memory device.

As further illustrated in FIG. 1, the video call center system 20 is located on the call center computer systems 8. In some embodiments of the invention, the video call center system 20 can be a stand alone system or part of another system that is not located on the call center computer systems 8, but is connected to other devices through the network 2. The video call center system 20 generally comprises a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the branch computer systems 4, customer computer systems 40, branch document center 50, and other business systems. As such, the communication device 22 generally comprises a modem, server, or other device(s) for communicating with other devices on the network 2, and a display, camera, keypad, mouse, keyboard, microphone, and/or speakers for communicating with one or more experts 9.

As illustrated in FIG. 1, the video call center system 20 comprises computer-readable program instructions 28 stored in the memory device 26, which in one embodiment includes the computer-readable instructions 28 of a video collaboration application 100 and a call manager application 110, as well as other banking tools. In some embodiments, the memory device 26 includes a datastore 29 for storing data related to the video call center system 20, including but not limited to data created and/or used by the video collaboration application 100, the call manager application 110, and other banking tools. The video collaboration application 100 as previously explained with respect to the video collaboration system 10, allows an expert 9 to participate in video collaboration sessions with a customer 6 and/or associate 7 located outside of the call center in order to help answer questions about products and services when an associate 7 is not available, does not have the required expertise, or is busy with other customers.

The call manager application 110, is used to identify the proper queues and routing rules that determine what expert 9 is available, what type of calls the expert can receive, and where and when to route the video calls. In some embodiments of the invention the video call center system 20 communicates with the existing non-video call center queuing systems used to route non-video calls in the call centers, in order to route both the video calls and non-video calls to the proper experts 9. The existing non-video call center queuing systems are located on the call center computer systems 8, and have the same or similar devices as the video call center system 20 (i.e. communication device, processing device, memory device with computer-readable instructions and datastore, etc.). The existing non-video call center queuing systems comprise the call queuing applications that are used to queue and route telephone calls received by the call center. In other embodiments of the invention, the video call center system 20 has the capability to receive both video calls and non-video calls and route the calls to the proper experts 9 using the call manager application 110. Therefore, the video collaboration system 20 and existing non-video call center queuing systems can be one system or multiple systems that queue and route all types of calls to the proper experts 9 at one or more call centers and banking centers. The video collaboration system 20 and existing non-video call center queuing system, individually or together, have the ability to queue and route video calls and non-video calls over networks, telephone lines, or other communication or data transmission hardware and software using traditional phone numbers, internet protocol (IP) addresses, e-mail addresses, or any other type of identifier.

The other banking tools comprise, but are not limited to programs and tools used by the customers 6, associates 7, and/or experts 9 for accessing banking information, forms, price calculators, as well as other tools that can be used in connection with exchanging product and service information between customers 6, associates 7, and/or experts 9.

As further illustrated in FIG. 1, the customer system 30 is located on the customer computer systems 40. The customer system 30 generally comprises a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the branch computer systems 4, the call center computer systems 8, the branch document center 50, and other business systems. As such, the communication device 32 generally comprises a modem, server, or other device(s) for communicating with other devices on the network 2, and a display, camera, keypad, mouse, keyboard, microphone, and/or speakers for communicating with one or more customers 6.

As illustrated in FIG. 1, the customer system 30 comprises computer-readable program instructions 38 stored in the memory device 36, which in one embodiment includes the computer-readable instructions 38 of a video collaboration application 100 and an online banking application 130. In some embodiments, the memory device 36 includes a datastore 39 for storing data related to the customer system 30, including but not limited to data created and/or used by the video collaboration application 100 and online banking application 130.

The online banking application 130 allows customers 6 to access their accounts from customer computer systems 40 located anywhere that has access to the network 2. The online banking application 130 also allows customers 6 to search, research, apply, and sign-up for products and services offered by the bank. In some embodiments of the invention the customers 6 can use the video collaboration application 100, which in some embodiments works in conjunction with the online banking application 130 or other applications and systems, to speak to banking experts 9 face-to-face over the internet, in order to receive more information about and sign-up for products and services offered by the bank. The customers 6 can contact the experts 9 from the location at which the customer computer system 40 is located without ever having to enter a bank branch. In some embodiments of the invention, the video collaboration application 100, is a part of or contained within the online banking application 130, but regardless of how it is configured it will work in the same or similar way as described herein.

As further illustrated in FIG. 1, the branch computer systems 4, call center computer systems 8, and in some embodiments customer computer systems 40 are operatively coupled to the branch document center 50 and other business systems. The branch document center 50 and other business systems have devices the same or similar to the devices described for the branch computer systems 4, call center computer systems 8, and customer computer systems 40 (i.e. communication device, processing device, memory device with computer-readable instructions, datastore, etc.). In this way, the customers 6, associates 7, and experts 9 can use the branch computer systems 4, the call center computer systems 8, and the customer computer systems 40 to access or use information, applications, and tools on the other business systems, and print, scan, copy, fax, or e-mail documents to or through the branch document centers 50.

FIG. 2, illustrates a video collaboration process 200 describing how a customer 6, associate 7, and expert 9 utilize a video collaboration application 100 to improve customer service and sales. When a customer 6 enters a banking center and is looking to perform actions that are not related to simple transactions with a teller at the banking center, the customer 6 would typically meet with a banking center associate 7. If the associate 7 could not answer the customer's questions and the banking center had no expert 9 available, the customer would have to be transferred to an associate over the phone, referred to another banking center location, or set up an appointment with an expert at the current banking center or another banking center at a later date. However, the present invention allows the customer to have a collaborative face-to-face interaction without the need to make an appointment, connect by telephone, or visit another banking center.

In the present invention, when the customer enters the banking center an associate 7 identifies the products and services in which the customer 6 is interested and then determines if the customer's needs can be handled though a video collaboration session, as illustrated by decision block 202. For example, if the associate 7 determines that the customer either has questions about a complex, time consuming, or specialized product or service, needs further understanding about a product or service, has been to the banking center before to resolve an issue, or additional research into the customer's questions is needed, to name a few, the associate might direct the customer 6 to a video collaboration session. Some specific banking products and services that might qualify for a video collaboration sessions include, but are not limited to, mortgage or home equity loan information, customer service resolution issues, investment advice, or small business loans. Still in other embodiments of the invention the video conference session can be used by management and the associates themselves for meetings, training activities, etc.

As illustrated by block 204, if the banking center associate 7 determines that the customer's needs cannot be handled by a video collaboration session then the associate 7 will handle the issue herself. However, if the banking center associate 7 determines that the customer's needs can be handled by video collaboration then as illustrated by decision block 206 the associate confirms with the customer 6 that the customer 6 would be comfortable talking with an expert 9 over a video collaboration session. If the customer 6 is not willing to talk with an expert 9 over a video collaboration session then, as illustrated by block 204, the associate 7 will handle the customer's need through standard processes (i.e. provide services herself, set up an appointment with an expert 9, transfer the customer 6 to a telephone representative, have the customer 6 visit another banking center location). However, if the customer 6 is willing to talk with an expert 9 over a video collaboration session then the associate 7 takes the customer 6 to a video conference room and uses the video collaboration system 10 to connect to the appropriate call center.

One embodiment of the video collaboration system 10 is illustrated in FIGS. 3A and 3B. In the illustrated embodiment, the video collaboration system 10 is a stand alone video system 300 that comprises a video camera 310, a display 320, and a remote 350. In some embodiments of the invention, the video system 300 is a stand alone system as illustrated in FIGS. 3A and 3B. However, in other embodiments of the invention the video system 300 is a desktop, laptop, tablet, or other like computer system, but will function in the same or similar way as the video system 300. In some embodiments the video system 300 is a web-based system that has a webcam and a display.

In order to connect to the proper expert 9 over the video collaboration system 10, the associate 7 first opens the menu on the video collaboration system 10, as illustrated by block 208. Thereafter, the associate 7 selects the language to use for the call, based on the language the customer desires, as illustrated by block 210. The associate 7 then selects the address book 352 button on the remote 350. In response, the display 320 provides a list of contacts with which to establish a video collaboration session. As illustrated by block 212, the associate 7 identifies the proper call center (or baking center or contact if the expert 9 is not located at a call center) on the display 320 based on the customer's needs, and selects the place call 354 button. The connection that is made when the associate 7 makes the call, in some embodiments, is a video number that allows the transfer of data over the network 2. The video number in some embodiments is an Internet Protocol (IP) address, or other like number. In other embodiments of the invention the video number is a telephone number, e-mail address, messaging addresses, virtual network number, or other like number that allows data to be transferred over the network 2. In other embodiments of the invention, the associate 7 can make the selection of the proper call center, banking center, or expert 9, from a touchpad, dial pad, remote selection, or other like computer tool by dialing the number directly or selecting the appropriate location or person.

The display 320 also has a number of icons that describe what is taking place during the video collaboration session. For example, the phone icon 322 indicates that a call is in session, the microphone off icon 324 indicates when the microphone is off, the volume off icon 326 indicates when the volume is off, the bad network icon 328 indicates if network anomalies exist, like packet loss, jitter, etc. during a call, the on air icon 330 indicates what party has the floor to speak, the open padlock icon 332 indicates that the connection is not yet secure when the call is initialized, the closed padlock icon 334 indicates that the Data Encryption Standard (DES) connection is secure, the double padlock icon 336 indicates that the Advanced Encryption Standard (AES) connection is secure.

As illustrated by block 214, and explained in further detail later, when the video call is placed, the video call is routed to the appropriate expert 9 based on the selection the associate 7 or customer 6 made. In some embodiments of the invention the expert 9 does not have to be located at a station in a call center, the expert 9 can be located at another location, such as but not limited to, a banking center station, an office station, a station at an expert's home, or other location, etc., and the call is routed to wherever the expert 9 is located. As illustrated by decision block 216, the call manager application 110 will determine (in some embodiments with the help of the existing non-video call center queuing system) if the required expert 9 is available to take the video call. The call manager application 110 tracks metrics that determine what experts 9 can receive the video call, which of those experts 9 are available, and which of the experts 9 have the best ability to meet the customer's needs. If an expert 9 that meets the call requirements is available, as determined by the call manager application 110, explained in greater detail later, the call is routed to the expert 9 and the expert answers the call, as illustrated in block 228.

If the experts 9 that have the training to answer the call are not currently available, then the call is entered into a queue, as illustrated by block 218. In some embodiments of the invention, while the customer's call is in the queue waiting for the next available expert 9 the display 320 of the video collaboration system 10 can show a presentation, advertisement, disclosure, or other information to occupy the customer 6 while the call is in the queue, as illustrated by block 220. In some embodiments of the invention, the presentation, advertisement, disclosure, or other information, is related to products or services for which the customer 6 is participating in the video collaboration session, other products or services the bank is offering, information about partners of the bank, events or charities in which the bank is a partner, etc.

As illustrated by block 222, in some embodiments the video call center system 20, using the call manager application 110, interfaces with the existing non-video call center queuing system to obtain the proper routing instructions. As illustrated by block 224, the call manager application 110, determines the next available associated based on defined metrics and the routing instructions from block 222. The metrics tracked include but are not limited to average handle time, staffing levels, expertise of the associates, etc. As illustrated by block 226, when the next available expert 9 with the required expertise becomes available the call is routed to the expert 9.

As illustrated by block 228, the call center expert 9 answers the video collaboration call. As illustrated by block 230, the customer 6 is presented with disclosures on the display, if necessary. For example, if the information the expert 9 is discussing is related to investment advice, the applicable disclosure is shown to the customer 6. After any necessary disclosures are presented, live video is displayed of the expert 9 to the customer 6 and vice versa in real-time or near real-time, as illustrated by block 232.

As illustrated in block 234, the banking center associate 7 introduces the customer 6, and provides the expert 9 with information related to the customer's needs and the reason for the video collaboration. In some embodiments of the invention, the information includes but is not limited to the proper account verification information, an outline of the customer's needs, etc.

As illustrated in block 236, in some embodiments, the associate 7 leaves the room and lets the expert 9 talk face-to-face with the customer 6 through the video collaboration application 100. In some embodiments of the invention, the associate 7 may need to stay in the room, in order to help the expert 9 handle all of the customer's needs. As illustrated by block 238 the expert 9 reviews the customer's needs and uses the other banking tools to develop solutions comprising banking products and services to meets the customer's needs.

As illustrated by block 240, the expert 9 can share applications and documents with the customer 7 on the display 320 of the video collaboration system 10, in order to help provide the customer 6 with the proper information. For example, the expert 9 can help a customer fill out the required paperwork for a mortgage or home equity line of credit. In other embodiments, the expert 9 can walk a customer 6 through customer statements related to the customer's accounts and investments. As illustrated by block 242, the expert 9 can also print any documentation for the customer 6, or the banking associate 7, directly to the document center 50 at the banking center. In this way, the customer 6 and/or associate 7 can begin to fill out the required paperwork for any products or services in which the customer 6 is interested. In some embodiments of the invention, the expert 9 or associate 7 can walk the customer 6 through filling out and signing any necessary documentation. The customer 6 or associate 7 can scan or fax the information back to the expert 9 or other bank employees at other locations, in order to begin processing the customer's request. In other embodiments of the invention the video collaboration system 10, also comprises or is coupled to an electronic signature pad. The electronic signature pad allows the expert 9 and the customer 6 to fill out paperwork electronically through the video collaboration system 10 and the customer 6 can sign the documents electronically without having to send and receive paper copies of the documents electronically.

As illustrated by decision block 244 if the customer has additional needs, then the expert 9 can review additional customer needs, as illustrated by block 238. Alternatively, if the expert 9 cannot help the customer 6 or the customer's needs are not satisfied by the expert 9, the expert 9 can submit the call to another expert 9 or queue, in the same or similar way that was done by the associate 7, in order to connect the customer 6 with the appropriate expert 9, as illustrated by block 216.

As illustrated by termination block 232, if the customer's needs are met then the call may end. After the call ends the customer 6 may or may not meet with the associate 7 before the customer leaves the banking center, in order to, for example, gather or submit documentation that the customer has filled out with the expert 9.

In some embodiments of the invention the video collaboration system 10 can be used directly from customer computer systems 40 located at the customer's home, place of business, or anywhere else with access to the Internet. The video collaboration systems 10, as previously described can be stand alone systems, or can be a part of a computer or other system.

FIG. 4 illustrates one embodiment of an online banking video collaboration process when a customer 6 uses the video collaboration system 10 through the customer's online banking application 130. As illustrated in block 402 of FIG. 4, in some embodiments, the customer 6 logs onto the customer's online banking application 130 using the customer computer systems 40. As illustrated by block 404, the online banking application connects to the bank's systems through the network 2, and authenticates that the customer 6 is in fact the correct customer 6 for the associated account. While in the online banking application 130 the customer 6 can search for products and services in which the customer 6 has an interest, as illustrated by block 406. While the customer is researching a particular topic through the online banking application 130 the bank can prompt the customer asking if the customer 6 would like to speak to an expert 9 regarding the information they are researching, as illustrated in block 408. In other embodiments of the invention, the customer 6 can ask to speak to an expert 9 that knows about the products and services for a particular area of interest that the customer 6 is researching. As illustrated in block 410, the bank will prompt the customer 6 to identify or confirm the subject matter in which the customer is interested.

As illustrated by block 412, when the video call is placed, the video call is routed to the appropriate call center, banking center, or expert 9 based on the information from blocks 406, 408, and/or 410. In other embodiments of the invention the call is routed to the proper call center, banking center, or individual expert 9 based on what products or services the customer 6 was researching or based on a selection made by the customer 6.

As illustrated by decision block 414, the video call center system 20 determines if there is an available expert 9 to speak to the customer 6. As previously described, the call manager application 110 determines (in some embodiments with the help of the existing non-video call center queuing system) if the required expert 9 is available to take the video call. The call manager application 110 tracks metrics that determine what experts 9 can receive the video call, which of those experts 9 are available, and which of the experts 9 have the best ability to meet the customer's needs. If an expert 9 that meets the call requirements is available, as determined by the call manager application 110, the call is routed to the expert 9 and the expert answers the call, as illustrated in block 426.

Alternatively, as illustrated by block 416 if a qualified expert 9 is not available to take the customer's call, then the call is queued. In some embodiments, as previously described with respect to the video collaboration system 10 for the banking centers, while the call is in the queue, presentations, advertisements, disclosures, and/or information is provided to the customer 6 on the display of the customer computer system 40, as illustrated by block 418.

As illustrated by block 420, in some embodiments, the call manager application 110 interfaces with the existing non-video call center queuing system to obtain the proper routing instructions. As illustrated by block 422, the call manager application 110, determines the next available expert 9 based on defined metrics and the routing instructions from block 420. The metrics tracked include, but are not limited to, average handle time, staffing levels, expertise of the associates, etc. As illustrated by block 424, when the next available expert 9 with the required expertise becomes available the call is routed to the expert 9.

The expert 9 answers the call, as illustrated by block 426, and the customer 6 is presented with disclosure information, as illustrated by block 428. As illustrated by block 430 live video in real-time or near real time is displayed to both the expert 9, at the expert's location (i.e. a call center station, a banking center station, an office station, an expert's home, or other location, etc.), and the customer 6 on the customer computer systems 40.

The expert 9 receives information from the customer 6 to verify the identity of the customer 6 and determines the customer's needs, as illustrated by block 432. As previously described with respect to the video collaboration system 10 located at the banking center, the expert 9 can share applications and documents with the customer 6 on the display of the customer computer systems 40, as illustrated by block 434. In some embodiments of the invention the expert 9 provides documents, applications, or tools electronically to the customer to view or print, as illustrated by block 436. As illustrated by block 436, the customer 6 can print and fill out any documents and fax or e-mail them back to the expert 9 or another location. In other embodiments of the invention, the customer 6 fills out the documents electronically with the expert 9 and sends them to the appropriate party.

As illustrated by decision block 438, the expert 9 determines if the customer's needs have been satisfied. If the customer's needs have not be satisfied then the expert 9 can provide more information to the customer 6, but in some embodiments the expert 9 routes the customer's call back to the next available expert 9 that is qualified to discuss the additional needs of the customer 6, as illustrated by blocks 432 and 414. However, in the alternative, if the customer's needs are satisfied the call may end, as illustrated by termination block 440.

In some embodiments of the invention the call center can be staffed with video experts 9 who specialize in one or more products or services. When a call is made through the video collaboration application 100 from branch computer systems 4 or customer computer systems 40, the video call center systems 20 will ring for each expert 9 that is properly trained to handle the incoming call. The first expert 9 to answer the call determines what the customer needs are and provides the customer 6 with assistance. While embodiments of the invention for call centers can work this way, these embodiments can result in overstaffing the centers, which leads to many experts 9 spending much of their time not talking to customers 6. Unless the business can achieve large enough economies of scale, it is too expensive to staff an entire call center of only video collaboration experts 9 that have an expertise in only one area. In order for a call center to provide customer support on a more cost effective basis, the call center is staffed with experts 9 that have the ability to perform a number of tasks through video calls, non-video calls, messaging chats, etc.

In some embodiments of the invention a call center is staffed with combinations of experts 9 who only take non-video calls, experts 9 who take only video calls, experts 9 who take only chats, and/or experts 9 who take combinations of the three types. In some embodiments, the experts 9, regardless of the types of calls or chats they receive, are well versed in a number of products and services within the bank. For example, experts 9 can have an area of expertise, but they also can be able to work on a number of other matters outside of their area of expertise. Typically, the most complex customer needs take up the most time, but do not occur as often as simpler customer needs. Experts 9 can fill in the time outside of dealing with complex customer needs within their area of expertise with simpler customer needs. A call center, in some embodiments comprises a few experts with video collaboration tools as well as regular phone lines, capable of taking video collaboration calls and non-video calls. The call center, in some embodiments, also has experts 9 with the capability of answering non-video calls only and in some embodiments, also has experts 9 with the capability of answering only video calls.

FIG. 5 illustrates one embodiment of a call queuing process for a call center that provides customers with different types of experts 9 to satisfy customer needs. As illustrated in block 502 the video call center system 20 receives a call from a branch computer system 4, customer computer system 40, phone line, or other type of system. The video call center system 20 determines the type call being received, as illustrated by decision block 504. If the call is a phone call, it can be identified by the number called or the type of incoming call (i.e. an eleven or ten digit number). If the call is a video call it can be identified by the video number called or the type of call (i.e. IP address, etc.).

If the call is a phone call, or other non-video call, the video call center system 20 identifies what the call relates to depending on a number of factors, as illustrated in block 506. In some embodiments, there are a number of telephone numbers that the customer can call, but they are all routed to the same call center. In these embodiments the call center can determine what experts 9 to route the call to by identifying the number that customer 6 called. In other embodiments of the invention, when the customer 6 selects a number the customer 6 is asked by an automated system (or a person) to provide information related to why the customer 6 is placing the call. In these embodiments the video call center system 20 identifies the information provided by the customer through customer 6 or associate 7 input, and directs the call to the appropriate expert 9 or call center. As illustrated in decision block 508, the video call center system 20 determines if there is an expert 9 available that can help the customer 6 based on the customer's needs identified in block 506 and/or the metrics tracked by the video call center system 20. For example, the video call center system 20 tracks metrics, such as, but not limited to, how many experts 9 are working, what type of call each expert 9 can handle (i.e. video, non-video, or both), what products and services each expert 9 is trained to discuss with the customer 9, what experts 9 speak the language of the customer, what experts 9 are currently on a call, what experts 9 are waiting to be called, what are the average handle times for each expert 9, etc. The video call center system 20 matches up the calls with the experts 9 that can receive the calls, and selects the best available expert 9 for the call. As illustrated in block 512 if there is an available expert 9 (e.g. all experts 9 with phone capabilities, who are not on a call, who are trained in the products and services related to the customer's call, etc.), the non-video call is routed to the best available expert 9, and the expert 9 answers the phone. If an expert 9 is not available then the customer's call is sent to the queue to wait for the next available expert 9, as illustrated by block 510. When the next expert 9 becomes available (e.g. is not on a call, has the required expertise, has phone capability, etc.) the call is routed to that expert 9 and the expert answers the phone, as illustrated by block 512.

The expert 9 identifies the customers 6 needs and provides the relevant information to the customer 6, as previously discussed. As illustrated by decision block 514 if the expert 9 has handled all of the customer's needs, then the call may end as illustrated by block 540. However, if the customer needs additional help the current expert 9 can handle the customer's needs, or the current expert 9 can transfer the call to another expert 9 that has the required expertise at the call center if the current expert 9 does not have the necessary expertise. In some embodiments of the invention, the current expert 9 can enter in additional information related to the customer 6 in order to allow the video call center system 20, though the call manager application 110, to determine to what expert 9 to transfer the call.

As illustrated by block 516, the current expert 9 determines if the customer 6 wants to speak to a video expert 9. If the customer 6 does want to speak to a video expert 9 with video capabilities, the call is routed to an expert 9 with video capabilities, as described in further detail later. If the customer 6 does not want to speak to an expert 9 with video capabilities, the video call center system 20 determines if there is an available expert 9 with non-video capabilities who can handle the needs of the customer 9, as illustrated by decision block 518. The new expert 9 can have both video capabilities and non-video capabilities, but the new expert 9 only uses the non-video capabilities with this particular customer 6. If there is not an available new expert 9 the call is sent to the queue to await the next available expert 9, as illustrated by block 510. If there is an available expert 9, the call is routed to the new expert 9, the new expert 9 answers the call and repeats the customer service processes previously described.

Alternatively, if the original call received is identified as a video call, the video call center system 20 identities the needs of the customer 6 on the call, as illustrated by block 520. In some embodiments, there are multiple video numbers (i.e. IP addresses, etc.) that are selected by a customer 6 or an associate 7, which all go to the same call center. However, the type of call is determined based on the selection made by the associate 7, or in some embodiments the customer 6. In other embodiments of the invention the associate 7 or the customer 6 provides the video call center system 20 with some information before the call is placed, and when that call is sent to the call center computer systems 8 the information is sent with the call. Therefore, in some embodiments of the invention the video call center system 20 can use the information provided from block 520 and/or the metrics tracked by the video call center system 20, as previously discussed with respect to the non-video call, to match up the customer's needs in the call with an available expert 9 (e.g. has video capabilities, is not currently on a call, speaks the customer's language, has the expertise to handle the customer's call, etc.), as illustrated by decision block 522.

If there is an expert 9 available, the expert 9 will answer the call, as illustrated by block 526. If there is no expert 9 available the video call is routed to a queue to await the next available expert 9, as illustrated by block 524. In some embodiments of the invention, the video and non-video call queues can be one queue or multiple queues, and can be used strictly for various types of experts 9 or for all of the experts 9 in the call center or multiple call centers. In some embodiments of the invention, as previously discussed, while the customer 6 is on hold in the video queue the video call center system 20 can provide presentations, disclosures, advertisements, or information for the customer 6 to review. In some embodiments, the presentations, advertisements, disclosures, or information is related to the products or services that the customer is calling about. When the next available video expert 9 becomes available the call is routed to that expert 9, as illustrated by block 526. The video expert 9 will authenticate the customer 6, identify the customer's needs, and provide the customer 6 with the necessary information as previously explained with respect to FIGS. 2 and 4.

The expert 9 then identifies if the customer 6 needs any additional information, as illustrated by block 528. If the customer does not need additional information the call may end, as illustrated by termination block 540. If however, the customer 6 needs additional information the current expert 9 can provide it, if the current expert 9 is qualified, or route it to another expert 9. The current expert 9 will first determine if the customer 6 wants to speak to another expert 9 with video capabilities, as illustrated by decision block 516. If the customer does not want to speak to a video expert 9, then the call is routed to next available non-video expert 9, as previously described and illustrated by block 518. If the customer 6 does want to speak to another video expert 9, the video call center system 20 will determine if there is a new expert 9 available that can meet the customer's needs, as illustrated by decision block 530. As previously discussed, the call is routed to the proper expert 9 based on information provided by the customer 6 or associate 7 during the call with the current expert 9. The current expert 9 can transfer the call to the appropriate video number or in some embodiments provide the video call center system 20 with the necessary information to transfer the call. If there is a new expert 9 available, the video call center system 20 routes the call to the new expert 9 and the new expert 9 handles the customer's needs as previously explained, as illustrated by block 526. However, if there is no new expert 9 available, the call is routed to the queue and the customer 6 waits for the next available expert 9, as previously discussed and illustrated by block 524. The process continues until the customer 6 is satisfied and the call ends, as illustrated by termination block 540.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

U.S. patent application Ser. No 12/847,404 to Benefield et al. and entitled "Video Collaboration Call Center Queuing" (originally filed as "Routing and Queuing Information for Video Conferencing in Banking Centers") is filed concurrently with the present application and is hereby incorporated by reference.

What is claimed is:

1. A system for routing and queuing calls comprising:
   a memory device;
   a communication device;
   a processing device operatively coupled to the communication device and the memory device; and
   computer readable program code stored on said memory device, wherein said computer readable program code includes instructions that when performed by said processing device causes said processing device to:
      receive an incoming call from a customer interface located at a banking center wherein the incoming call is initiated by an associate for the benefit of a customer based on a customer inquiry;
      determine a type of call for the incoming call, wherein the type of call is one of at least two types of calls comprising a video call or a non-video call, and wherein the determining the type of call for the incoming call comprises:
         determining a video type of call, when the incoming call includes video capabilities; and
         determining a non-video type of call, when the incoming call does not include video capabilities;
      determine a type of customer inquiry associated with the incoming call, wherein the type of customer inquiry is initiated by the associate when the associate initiates the incoming call based on the customer inquiry;

identify one or more representatives available to accept the incoming call based on the type of call and the type of customer inquiry, wherein the one or more representatives qualify as an expert for the customer inquiry;

determine handle time information for the one or more representatives available to accept the incoming call when the one or more representatives are available;

determine staffing level information associated with the one or more representatives available to accept the incoming call when the one or more representatives are available, wherein the staffing level information comprises the one or more representatives that have only audio capabilities, the one or more representatives that have only video capabilities, and the one or more representatives that have both audio and video capabilities;

route the incoming call to a representative of the one or more representatives available based at least in part on the handle time information and the staffing level information;

route the incoming call to a queue when none of the one or more representatives are available;

display via the customer interface and a representative interface, information associated with the type of customer inquiry when the incoming call includes video capabilities; and receive via the customer interface, input from the customer, wherein the input is an electronic signature related to the information associated with the type of customer inquiry.

2. The system of claim 1, wherein said computer readable program code includes computer instructions that when performed by said processing device causes said processing device to:

output visual media to a display for viewing by the customer while the call is in the queue when the call is determined to be video enabled.

3. The system of claim 1, wherein said computer readable program code includes computer instructions that when performed by said processing device causes said processing device to:

identify from routing instructions associated with the call a desired language associated with the customer; and route the call to a station associated with personnel capable of communicating in the desired language.

4. The system of claim 1, wherein determining the type of customer inquiry comprises determining subject matter in which the customer is interested and if the subject matter requires an electronic signature; wherein identifying one or more representatives available to accept the incoming call is based on the subject matter in which the customer is interested and if the one or more representatives can accept the electronic signature.

5. The system of claim 1, wherein the one or more representatives are located at a call center.

6. A method for routing and queuing calls comprising:

receiving, by a processing device, an incoming call from a customer interface located at a banking center, wherein the incoming call is initiated by an associate for the benefit of a customer based on a customer inquiry;

determining a type of call for the incoming call, wherein the type of call is one of at least two types of calls comprising a video call or a non-video call, and wherein the determining the type of call for the incoming call comprises:

determining a video type of call, when the incoming call includes video capabilities; and determining a non-video type of call, when the incoming call does not include video capabilities;

determining a type of customer inquiry associated with the incoming call, wherein the type of customer inquiry is initiated by the associate when the associate initiates the incoming call based on the customer inquiry;

identifying one or more representatives available to accept the incoming call based on the type of call and the type of customer inquiry, wherein the one or more representatives qualify as an expert for the customer inquiry;

determining handle time information for the one or more representatives available to accept the incoming call when the one or more representatives are available;

determining staffing level information associated with the one or more representatives available to accept the incoming call when the one or more representatives are available, wherein the staffing level information comprises the one or more representatives that have only audio capabilities, the one or more representatives that have only video capabilities, and the one or more representatives that have both audio and video capabilities;

routing the incoming call to a representative of the one or more representatives available based at least in part on the handle time information and the staffing level information;

routing the incoming call to a queue when none of the one or more representatives are available displaying via the customer interface and a representative interface, information associated with the type of customer inquiry when the incoming call includes video capabilities; and receiving via the customer interface, input from the customer, wherein the input is an electronic signature related to the information associated with the type of customer inquiry.

7. The method of claim 6, further comprising:

outputting visual media to a display for viewing by the customer while the call is in the queue when the call is determined to be video enabled, through the use of the processing device.

8. The method of claim 6, further comprising:

identifying from routing instructions associated with the call a desired language associated with the customer, through the use of the processing device; and routing the call to a station associated with personnel capable of communicating in the desired language, through the use of the processing device.

9. The method of claim 6, wherein determining the type of customer inquiry comprises determining subject matter in which the customer is interested and if the subject matter requires an electronic signature; wherein identifying one or more representatives available to accept the incoming call is based on the subject matter in which the customer is interested and if the one or more representatives can accept the electronic signature.

10. The method of claim 6, wherein the one or more representatives are located at a call center.

11. A computer program product for a system for routing and queuing call center calls, the computer program product comprising at least one non-transitory computer-readable medium having computer-readable program code portions embodied therein, the computer-readable program code portions comprising:

an executable portion configured for receiving an incoming call from a customer interface located at a banking center wherein the incoming call is initiated by an associate for the benefit of a customer based on a customer inquiry;

an executable portion configured for determining a type of call for the incoming call, wherein the type of call is one of at least two types of calls comprising a video call or a non-video call, and wherein the determining the type of call for the incoming call comprises:

determining a video type of call, when the incoming call includes video capabilities; and determining a non-video type of call, when the incoming call does not include video capabilities;

an executable portion configured for determining a type of customer inquiry associated with the incoming call, wherein the type of customer inquiry is initiated by the associate when the associate initiates the incoming call based on the customer inquiry;

an executable portion configured for identifying one or more representatives available to accept the incoming call based on the type of call and the type of customer inquiry, wherein the one or more representatives qualify as an expert for the customer inquiry;

an executable portion configured for determining handle time information for the one or more representatives available to accept the incoming call when the one or more representatives are available;

an executable portion configured for determining staffing level information associated with the one or more representatives available to accept the incoming call when the one or more representatives are available, wherein the staffing level information comprises the one or more representatives that have only audio capabilities, the one or more representatives that have only video capabilities, and the one or more representatives that have both audio and video capabilities an executable portion configured for routing the incoming call to a representative of the one or more representatives available based at least in part on the handle time information and the staffing level information;

an executable portion configured for routing the incoming call to a queue when none of the one or more representatives are available;

an executable portion configured for displaying via the customer interface and a representative interface, information associated with the type of customer inquiry when the incoming call includes video capabilities; and an executable portion configured for receiving via the customer interface, input from the customer, wherein the input is an electronic signature related to the information associated with the type of customer inquiry.

12. The computer program product of claim 11, further comprising:

an executable portion configured for outputting visual media to a display for viewing by the customer while the call is in the queue when the call is determined to be video enabled.

13. The computer program product of claim 11, further comprising:

an executable portion configured for identifying from routing instructions associated with the call a desired language associated with the customer; and an executable portion configured for routing the call to a station associated with personnel capable of communicating in the desired language.

14. The computer program product of claim 11, wherein the computer-readable program code portions further comprise:

an executable configured for displaying via the customer interface and a representative interface, information associated with the type of customer inquiry when the incoming call includes video capabilities; and an executable portion configured for receiving via the customer interface, input from the customer, wherein the input is an electronic signature related to the information associated with the type of customer inquiry.

15. The computer program product of claim 11, wherein the one or more representatives are located at a call center.

\* \* \* \* \*